(12) United States Patent
Laborbe et al.

(10) Patent No.: US 8,609,166 B2
(45) Date of Patent: Dec. 17, 2013

(54) PREPARATION OF PRODUCTS HAVING ROASTED APPEARANCE

(75) Inventors: Jean-Marie Laborbe, Amiens (FR); Frédéric Lefebvre, Albert (FR)

(73) Assignee: Nestec S.A., Vevey (CH)

( * ) Notice: Subject to any disclaimer, the term of this patent is extended or adjusted under 35 U.S.C. 154(b) by 2106 days.

(21) Appl. No.: 10/501,975

(22) PCT Filed: Jan. 14, 2003

(86) PCT No.: PCT/EP03/00286
§ 371 (c)(1),
(2), (4) Date: Jul. 15, 2004

(87) PCT Pub. No.: WO03/059090
PCT Pub. Date: Jul. 24, 2003

(65) Prior Publication Data
US 2005/0042330 A1 Feb. 24, 2005

(30) Foreign Application Priority Data
Jan. 18, 2002 (EP) .................................. 02001035

(51) Int. Cl.
*A23L 1/31* (2006.01)
*A23L 1/48* (2006.01)

(52) U.S. Cl.
USPC .............. 426/92; 426/264; 426/302; 426/805

(58) Field of Classification Search
USPC ........... 426/92, 805, 262, 264, 265, 268, 302, 426/303, 304, 540, 647, 657
See application file for complete search history.

(56) References Cited

U.S. PATENT DOCUMENTS

| | | | | |
|---|---|---|---|---|
| 1,956,784 A | * | 5/1934 | Allen | 426/250 |
| 2,567,085 A | * | 9/1951 | Stoloff | 426/310 |
| 2,938,800 A | * | 5/1960 | Sair | 426/540 |
| 3,073,700 A | * | 1/1963 | Ziegler | 426/262 |
| 3,395,024 A | * | 7/1968 | Earle | 426/291 |
| 3,427,168 A | * | 2/1969 | Rose et al. | 426/250 |
| 3,434,843 A | * | 3/1969 | Durst | 426/98 |
| 3,586,512 A | * | 6/1971 | Mancuso et al. | 426/250 |
| 3,808,340 A | * | 4/1974 | Palmer | 426/92 |
| 3,851,083 A | * | 11/1974 | Brooking et al. | 426/654 |
| 3,873,736 A | * | 3/1975 | Palmer et al. | 426/92 |
| 3,898,345 A | * | 8/1975 | Horrocks et al. | 426/274 |
| 3,900,573 A | * | 8/1975 | Freck et al. | 426/274 |
| 3,965,259 A | * | 6/1976 | Coppage et al. | 426/90 |
| 4,089,983 A | * | 5/1978 | Hood | 426/250 |
| 4,247,562 A | * | 1/1981 | Bernotavicz | 426/72 |
| 4,508,741 A | * | 4/1985 | Corbett et al. | 426/303 |
| 4,585,659 A | * | 4/1986 | Hussey | 426/332 |
| 4,735,812 A | | 4/1988 | Bryson et al. | |
| 4,781,939 A | * | 11/1988 | Martin et al. | 426/646 |
| 4,942,043 A | * | 7/1990 | Sander | 426/2 |
| 5,059,444 A | * | 10/1991 | Ito et al. | 426/540 |
| 5,196,219 A | | 3/1993 | Hsu et al. | |
| 5,223,289 A | | 6/1993 | Domingues et al. | |
| 5,251,523 A | | 10/1993 | Fisher et al. | |
| 5,292,541 A | | 3/1994 | Underwood et al. | |
| 5,397,582 A | | 3/1995 | Underwood et al. | |
| 5,552,176 A | * | 9/1996 | Marino | 426/641 |
| 5,567,466 A | * | 10/1996 | Dupont-Delhovren | 426/641 |
| 5,756,140 A | | 5/1998 | Shoop et al. | |
| 6,090,421 A | | 7/2000 | Christophersen et al. | |

FOREIGN PATENT DOCUMENTS

| | | | |
|---|---|---|---|
| EP | 668 024 | | 8/1995 |
| GB | 2315399 A | * | 2/1998 |
| JP | 58190364 A | * | 11/1983 |
| WO | WO0065937 A1 | * | 11/2000 |

OTHER PUBLICATIONS

Igoe, Robert S. "Dictionary of Food Ingredients." Aspen Publications, 2001, pp. 14.*
Francis, Frederick. "Encyclopedia of Food Science and Technology" Second Edition, John Wiley & Sons, Inc.2000, p. 383.*
Dictionary of Food Science and Technology, pp. 393, 395, Blackwell Publishing, 2005.*
The University of Chicago—Celiac Disease Center—Gluten Free Diet http://www.celiacdisease.net/gluten-free-diet.*
Igoe, Robert. "Dictionary of Food Ingredients," p. 76.*
Igoe, Robert S. "Dictionary of Food Ingredients." Fourth Edition, Aspen Publishers, 2001, p. 126.*
The University of Chicago—Celiac Disease Center—Gluten Free Diet 2007 http://www.celiacdisease.net/gluten-free-diet.*
Igoe, Robert. "Dictionary of Food Ingredients," p. 76, 2001.*

* cited by examiner

*Primary Examiner* — Viren Thakur
(74) *Attorney, Agent, or Firm* — K&L Gates LLP

(57) ABSTRACT

The invention concerns a food composition, in particular an animal food composition, comprising a coating designed to provide a roasted appearance to the cooked product, said coating including at least a pigment or colorant source and a protein source.

2 Claims, No Drawings

PREPARATION OF PRODUCTS HAVING ROASTED APPEARANCE

FIELD OF THE INVENTION

The invention relates to a food composition comprising a particular coating for obtaining, after rapid cooking, products having a roasted appearance. The invention also relates to a process for producing this product.

STATE OF THE ART

The methods and products for obtaining browned, golden or smoked compositions have developed a great deal in the last few years with the appearance of new methods of cooking, such as the microwave oven or the steam oven, which make it possible to decrease the cooking time, but the great disadvantage of which is that they give the surface of the foods little colour, or none at all.

A first method for browning meat, fish, etc. consists in vaporizing or spraying coloured liquid solutions such as those described in U.S. Pat. No. 5,251,523 or U.S. Pat. No. 6,090,421. However, these solutions only contribute to providing a relatively uniform smoked appearance and, possibly, the characteristic taste of smoked foods.

Another process for browning food is pyrolysis of sugar and of starch described in U.S. Pat. No. 5,292,541 and U.S. Pat. No. 5,397,582. This involves solutions which are applied to the foods and which, after heating, give a smoked appearance and taste.

Another method used to imitate conventional cooking is that described in U.S. Pat. No. 5,756,140. It makes it possible to obtain foods which are golden and glazed at the surface and in fact merely consist of an alternative to conventional brushing with egg yolk.

Browning agents for microwave cooking or steam cooking, described in U.S. Pat. No. 5,196,219, U.S. Pat. Nos. 5,223,289 and 4,735,812 also exist. These agents are composed of at least a source of amino acids and a source of reducing sugars which, during cooking, carry out a Maillard reaction. All these inventions attempt to remedy one of the most notable deficiencies of microwave or steam cooking, i.e. the lack of brown colouring at the surface of foods such as, for example, meat, bread or pastries. The disadvantage of these browning agents is that they only incompletely imitate cooking in a conventional oven, by uniformly colouring the surface of the compositions.

The present invention makes it possible to overcome these disadvantages insofar as a uniform and homogeneous smoked, golden or coloured appearance is not merely produced, but rather a roasted appearance, as may be obtained after cooking in a conventional oven, i.e. irregular and random browning at the surface of the composition, while at the same time using more rapid cooking methods such as, for example, the steam oven or the microwave oven.

SUMMARY OF THE INVENTION

The present invention relates to a food composition, mainly animal food composition, comprising a particular coating for obtaining, after cooking, products having a roasted appearance. The composition of the coating comprises at least one pigment and a source of proteins. When the food composition is covered with this particular coating, it must be heated. The cooking temperature must be sufficiently high to allow coagulation of the proteins contained in the coating. The proteins thus coagulated fix the pigment. This reaction makes it possible to obtain compositions having a roasted appearance; the surface of these compositions is browned in a scattered manner, it being possible for the percentage of roasted surface to be modulated by simple modification of the amount of proteins and/or of colorants contained in the coating, or simply by varying the cooking times and temperatures.

The present invention also provides a method for preparing an emulsion, based on plant or animal proteins, which, by a process of co-extrusion, can be covered with this particular coating and, after cooking, can give this emulsion a roasted appearance.

Finally, this invention may relate more particularly to animal food and may be in the form of roasted pieces mixed with sauce or with a base, the entire mixture being sterilized. The term "base" is intended to mean a mixture of microground meats and of technological additives, to which natural pieces may, inter alia, be added.

The process of the present invention is completely different to that which currently exists in the sense that the food composition is coated with a mixture comprising at least one colorant or pigment and a source of proteins, which, after having been cooked using a cooking system such as the hot air system, steam system, hot air and steam system or microwave system, gives the composition a roasted appearance. The roasted appearance thus obtained is not homogeneous and this irregularity leaves the impression of a product cooked in a conventional oven.

In the present text, the term "meat" is intended to mean "meat and/or meat by-product", and the term "fish" is intended to mean "fish and/or fish by-product".

DETAILED DESCRIPTION OF THE INVENTION

The composition of the coating according to the present invention comprises at least one colorant such as, for example, caramelized sugar, blood (frozen or powdered) or mineral oxides, and a source of proteins, such as, for example, plasma or gluten. It may also contain components taken, for example, from the following: thickeners such as starch, guar, xanthan, carboxymethylcellulose, sodium alginate or other compounds belonging to these families; additives such as salt, sugar and ascorbic acid; flavouring agents (such as those which, for example, give the composition a roasted flavour); flour; water.

According to a preferred embodiment of the invention, the colorant may in particular be caramelized sugar (10 to 20% of the weight of the coating, preferably 14 to 16%), frozen or powdered blood (5 to 10%, preferably 7 to 8%), mineral oxides (5 to 10%, preferably 6 to 8%), or a mixture of these compounds.

It is also possible to add a thickener or a mixture of thickeners, for example in a proportion of 2 to 8% if it is starch, 0 to 2% if it is guar, xanthan or sodium alginate, 0 to 1% in the case of carboxymethylcellulose.

Binders or a mixture of binders can then be included in the composition or the coating according to the present invention, in an amount, for example, of 0 to 5% when the source chosen is gluten, 0 to 10% when the source of binder is plasma.

Additives may be added, in particular 0 to 5% of salt and/or of sugar, and/or 0 to 1% of ascorbic acid. The coating generally contains flour (25 to 35%) and water (30 to 50%).

Preferably, the source of proteins of the coating is chosen from plasma, gluten or blood, or a mixture of these compounds. However, any other source of proteins known to those skilled in the art may be used. The percentage of protein (by weight relative to the total weight of the coating) is preferably between 5 and 20%.

Production of the coating begins with the transfer of the dry ingredients into a kneading trough, which ingredients are then mixed with the other ingredients. The entire mixture is directed to a hopper equipped with a pump which takes the mixture to an emulsifying device. At this step, the coating is pasty. It can be stored, and then conveyed to the equipment required for coating the food composition. The pasty coating is then stored in a second hopper equipped with a pump which is used to transfer the coating through the specific equipment for combining the two by-products (coating-food composition to be coated).

The food composition to be coated may be an emulsion. In this case, the emulsion and the coating may be stored in two different hoppers, equipped with pumps, the flow rate of which can be modified by adjusting the frequencies of the variators. These pumps will be used to transfer the coating and the emulsion through specific equipment.

This specific equipment is provided with two different inlets and consists of a concentric combination of two tubes of different diameters. The coating is injected into the tube with the larger diameter in order to coat, on exiting the tube, the emulsion, which is itself injected into the central tube. This process can be compared to the process of co-extrusion which may be used in the dry food industry. The difference lies in the fact that the product used as filling in the dry food industry is not guided. The vein injected via a tube immersed in the extruded product does not mix with its coating.

In the present invention, the two by-products are guided for a certain distance in order to guarantee, at the outlet of the equipment, as perfect as possible a laminar flow so as not to have mixing between the two by-products. The viscosity of the two by-products has an impact on the efficiency of such a system.

The product thus prepared is transferred to the extruder.

It can then be cooked using a hot air, steam, hot air and steam, or microwave system, for example at a temperature and for a cooking time which vary according to the ingredients used.

The present invention may be applied to animal food and may be in the form of pieces which have a roasted appearance, mixed with a sauce or a base.

These pieces can be prepared from a mixture of 55 to 85% of meats and meat by-products and/or of fish and fish by-products, of 10 to 25% of cereals, and of 6 to 15% of water, said pieces preferably being prepared from a mixture of 58 to 68% of meats and meat by-products and/or of fish and fish by-products, 10 to 25% of cereals, 0 to 5% (preferably 2 to 5%) of plant proteins and 5 to 14% of water.

The meat emulsion is produced according to a conventional process described in patent EP 668 024. The meats and meat by-products and/or fish and fish by-products are crushed and ground so as to produce pieces which are of the order of 12 mm in size, and they are then incorporated into a mixer to which the dry ingredients of the recipe are added. The entire mixture is mixed until a homogeneous paste is obtained, and then transferred into a hopper equipped at the bottom with a pump for transferring the mixture to the emulsifying device. At this stage, colorants may optionally be added to the emulsion. The emulsifying is carried out in a double screen emulsifier (for example of the Karl Schnell type) at a maximum temperature of 15° C. The meat emulsion is then stored in a hopper equipped with a pump for transferring the emulsion to the specific equipment for the specific combining of the two by-products (coating-emulsion).

The product thus prepared is, for example, transferred to the extruder. The emulsion and its coating are in the form of blocks, the thickness and the width of which can vary according to the geometry of the equipment used.

The emulsion-coating assembly can then be cooked in a continuous cooking system (for example hot air, steam, hot air and steam, or microwave system) at a temperature and for a cooking time which vary according to the ingredients used. The blocks are thus set by coagulation and can be cut up on exiting the cooking device. The proteins of the coating have also coagulated and have trapped the pigment or colorant contained in this coating, thus giving the surface of the product a roasted appearance. The blocks can be cut up continuously on exiting the cooking system. The pieces can be hardened by cooling to a temperature of between 10 and 40° C.; the cooling is preferably carried out by spraying or immersion in order to avoid the pieces sticking to one another. These pieces can then be cubed and then mixed with the sauce or the base and transferred into containers. The composition can then in particular be sterilized conventionally at a temperature of between 120 and 135° C. for 20 to 100 minutes.

The following examples illustrate the invention in a non-limiting manner.

EXAMPLES

Example 1

The emulsion is prepared from 63% of meats and meat by-products, in particular from poultry by-products (mainly carcasses) and/or from pork or beef by-products (mainly liver and lungs), 15% of cereals, 1.5% of plant or animal texturing proteins and 15% of water. The emulsion also contains vitamins, salts, flavourings and colorants. This mixture is emulsified and stored in a hopper equipped with a pump which will subsequently be used to transfer the emulsion to the specific equipment.

The coating consists of a mixture of 15% of caramelized sugar, 6% of starch, 1% of guar, 0.5% of carboxymethyl-cellulose and 30% of flour, to which 40% of water and 7% of plasma are added until a homogeneous solution is obtained, which solution is then emulsified and then stored in a hopper equipped with a pump which will subsequently be used to transfer the emulsion to the specific equipment.

The coating and the emulsion are then injected into the specific equipment consisting of two concentric tubes (the emulsion is injected into the central tube and the coating into the tube of larger diameter). In order to avoid possible mixing between the emulsion and the coating, the products are guided over a distance of 60 cm.

The composition is then transferred to the extruder, and is then cooked in a steam oven at a temperature of 110° C. for 2 minutes 30 seconds. As it exits, the product is cut up (the shape and the size of the pieces varying according to whether the composition is for dogs or for cats), mixed with a sauce or base, and then sterilized conventionally.

Example 2

The emulsion is prepared from 63% of meat and meat by-products, in particular from poultry by-products (mainly carcasses) and/or from pork or beef by-products (mainly liver and lungs), 15% of cereals, 1.5% of plant or animal texturing proteins and 15% of water. The emulsion also contains vitamins, salts, flavourings and colorants. This mixture is emulsified and stored in a hopper equipped with a pump which will subsequently be used to transfer the emulsion to the specific equipment.

The coating consists of a mixture of 9% of powdered blood, 1% of guar, 1% of sodium alginate, 0.5% of carboxymethylcellulose, 3% of salt, 1% of sugar, 0.2% of ascorbic acid and 26% of flour, to which 49% of water and 2% of gluten and 5% of plasma are added.

The same production processes as previously described are used.

Example 3

The emulsion is prepared from 63% of meat and meat by-products, in particular from poultry by-products (mainly carcasses) and/or from pork or beef by-products (mainly liver and lungs), 15% of cereals, 1.5% of plant or animal texturing proteins and 15% of water. The emulsion also contains vitamins, salts, flavourings and colorants. This mixture is emulsified and stored in a hopper equipped with a pump which will subsequently be used to transfer the emulsion to the specific equipment.

The coating consists of a mixture of 5% of iron oxides, 5% of starch, 1% of guar, 1% of xanthan, 1% of carboxymethylcellulose, 2.5% of sugar and 30% of flour, to which 44% of water, 5% of plasma and 5% of gluten are added.

The same production processes as previously described are used.

The invention claimed is:

1. An animal food composition comprising:
an animal food piece comprising:
   from 55% to 85% by weight of at least one of a meat and a fish,
   from 10% to 25% by weight of a cereal, and
   from 6% to 15% by weight of water; and
a coating on the pet food piece and having a roasted appearance after cooking, wherein the coating comprises sodium alginate in an amount from about 1% to about 2%, from 5% to 10% by weight of at least one of a source of pigments or colorants selected from the group consisting of a powdered blood, a frozen blood and combinations thereof; and a source of proteins selected from the group consisting of a plasma, a gluten, a blood, and combinations thereof, wherein the coating contains from about 30% to about 50% by weight of water.

2. An animal food composition comprising:
an animal food piece comprising:
   from 58% to 68% by weight of at least one of a meat and a fish,
   from 10% to 25% by weight a cereal,
   from 2% to 5% of a plant protein, and
   from 5% to 14% by weight of water; and
a coating on the pet food piece and having a roasted appearance after cooking, wherein the coating comprises sodium alginate in an amount from about 1% to about 2%, at least one of a source of pigments or colorants selected from the group consisting of a powdered blood, a frozen blood and combinations thereof; and a source of proteins selected from the group consisting of a plasma, a gluten, a blood, and combinations thereof, wherein the coating contains from about 30% to about 50% by weight of water.

* * * * *